United States Patent [19]

Amingual et al.

[11] Patent Number: 5,216,510
[45] Date of Patent: Jun. 1, 1993

[54] IMAGING DEVICE

[75] Inventors: Daniel Amingual; Luc Audaire, both of Grenoble; Michel Rieux, Paris, all of France

[73] Assignee: Commissariat a L'Energie Atomique, Paris, France

[21] Appl. No.: 763,986

[22] Filed: Sep. 23, 1991

[30] Foreign Application Priority Data

Sep. 28, 1990 [FR] France .................................. 90 12011

[51] Int. Cl.⁵ ........................................... H04N 5/335
[52] U.S. Cl. ................ 358/213.15; 358/211; 358/209
[58] Field of Search .................... 358/209, 211, 213.11, 358/213.15, 213.18, 213.27, 228, 213.19, 224; 250/208.1, 229, 331, 332; 340/784

[56] References Cited

U.S. PATENT DOCUMENTS

| 4,427,306 | 1/1984 | Adamson | 374/128 |
|---|---|---|---|
| 4,670,653 | 6/1987 | McConkle et al. | 250/330 |
| 4,734,583 | 3/1988 | Wang et al. | 250/332 |
| 4,779,004 | 10/1988 | Tew et al. | 250/578 |
| 4,788,595 | 11/1988 | Tamada et al. | 358/213.31 |
| 4,808,822 | 2/1989 | Manning et al. | 250/332 |
| 4,910,413 | 3/1990 | Tamune | 250/578.1 |
| 4,917,476 | 4/1990 | Makh et al. | 250/331 |

FOREIGN PATENT DOCUMENTS

| 0138398 | 4/1985 | European Pat. Off. . |
|---|---|---|
| 60-242777 | 12/1985 | Japan . |
| 63-316573 | 12/1988 | Japan . |
| 1-85481 | 3/1989 | Japan . |
| 3-38978 | 2/1991 | Japan . |
| 2147172 | 5/1985 | United Kingdom . |

OTHER PUBLICATIONS

"Capture et poursuite d'un signal periodique noye dans le bruit a l'aid de filters a N-chemins", Technologie, No. 456, Aug.-Sep. 1980.
"Status of Sopradir IR-CCD Detectors", SPIE vol. 865 Focal Plane Arrays Technology and Applications (1987), pp. 65-70.
"The Random Access Memory", SPIE vol. 865 Focal Plane Arrays Technology and Applications (1987) pp. 45-51.

Primary Examiner—Michael T. Razavi
Assistant Examiner—Tuan V. Ho
Attorney, Agent, or Firm—Pearne, Gordon, McCoy & Granger

[57] ABSTRACT

Optoelectronic detectors (10) are arranged in matrix form. Integrated synchronous detectors (22) are connected to each-column of the detectors (10). The detection is modulated and the detection signals demodulated by the synchronous detectors (22) making it possible to considerably improve the signal/noise (S/N) ratio of the apparatus.

13 Claims, 5 Drawing Sheets

IMAGING DEVICE

DESCRIPTION

The present invention relates to an imaging device. It more particularly applies to cameras incorporating a matrix of a large number of detecting elements for photographing or shooting in all wavelength ranges.

Imaging devices have a matrix of detecting elements in their focal plane. The detecting elements convert a photon flux into an electrical signal. It is known that the detecting elements associated with reading circuits (amplifiers and impedance matching means) have a noise spectrum, which is the sum of two spectral densities.

Figure 1:
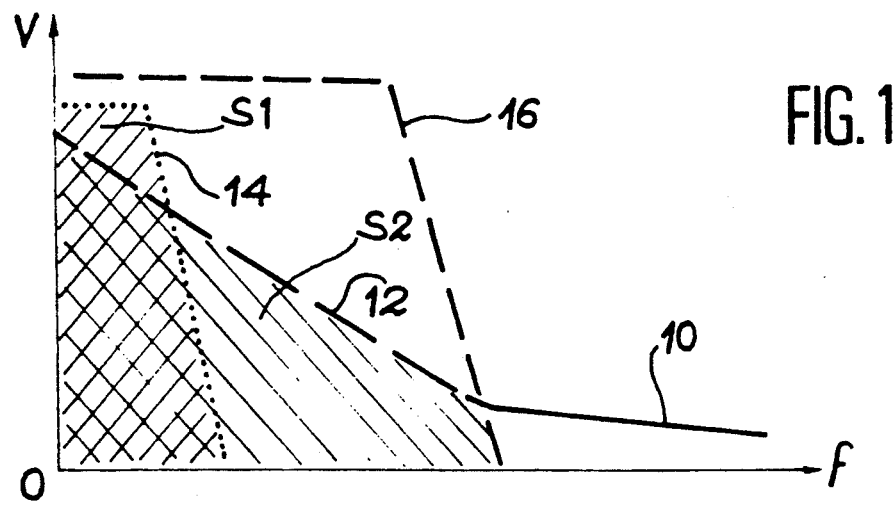

FIG. 1 diagrammatically shows such a noise spectrum as a function of the frequency. The latter comprises a component 10 (shown in continuous line form), which is referred to as "white noise" which is physically linked with a quantification of the current. This noise is the minimum noise of any electrical conduction phenomenon.

Another component 12 (shown in mixed line form) and referred to as "1/f" has an energy varying as the inverse of the frequency down to very low frequencies. This component characterizes the technology used for shooting.

Conventionally, in order to improve the sensitivity of detection of signals from a photosensitive matrix, with each detecting element is associated a circuit which, during the shooting time, integrates the signal corresponding with the detection.

FIG. 1 also shows in dotted line form, the spectrum 14 of the signal detected by a detecting element and integrated during the time of shooting and the transfer function 16 (in broken line form) of the circuit used for integrating the signal from each detecting element.

This type of shooting or imaging device suffers from numerous serious disadvantages.

Firstly, account is taken of so-called obscurity currents, which are continuous parasitic signals coming from the detecting element and its reading circuit. These currents, which have a thermal origin, contain no information on the incident photon flux. It is known that they increase exponentionally with temperature and beyond a critical temperature, these parasitic currents become more intense than the currents having a photon origin.

Another disadvantage of such a known apparatus is due to the presence of a mean illumination corresponding to a background illumination. The detection of the latter produces a parasitic or stray current, which can be very intense, more particularly in infrared imaging applications.

The obscurity and parasitic currents from a mean illumination carry no useful information, but participate in the rapid saturation of integrating circuits, so that shooting is not sensitive.

The fact that on the same matrix all the detecting elements do not have the same static operating point constitutes another disadvantage of known apparatuses. This arrangement normally known as "fixed pattern noise" appears directly in the video signal and must be corrected, which complicates the processing of said signal. Moreover, the known imaging devices integrate the noise component in 1/f of the detecting elements and the reading circuits (reference 12, FIG. 1). The signal carrying the information to be detected is superimposed on said interference (reference 14, FIG. 1).

The signal/noise (S/N) ratio is represented by the ratio S1/S2 of the hatched areas limited on the one hand by the curve 14 and on the other by the curve 12 and limited by the curve 16 (transfer function of the apparatus). It is clear from FIG. 1 that the taking into account of low frequency parasitic signals tends to considerably decrease the S/N ratio.

The object of the present invention is to obviate these disadvantages. For this purpose it recommends the connection of each detecting element to a synchronous detection means, all the synchronous detections being integrated into the same substrate as the reading circuits.

The use of a synchronous detection associated with each detecting element makes it possible to eliminate the continuous or d.c. component of the measuring signal. It also makes it possible to obtain freedom from the dispersion of the operating points of the different detecting elements.

As a result of the use of a synchronous detection with a sufficiently high modulating frequency, measurement takes place in a zone where the 1/f noise is virtually zero. As a result the S/N ratio is significantly improved. Synchronous detections integrated into the same substrate as reading circuits are placed in the focal plane of a camera and consequently cause no dimensional problem.

More specifically, the present invention relates to an imaging device comprising several optoelectronic detection means arranged in matrix form of at least one row and several columns, each optoelectronic detection means having a detecting element connected to a reading circuit; modulating means for modulating the optoelectronic detection means to a modulation frequency; several synchronous detection means at the modulation frequency; connecting means for connecting each optoelectronic detection means to a synchronous detection means; addressing means for the optoelectronic detection means; synchronization means able to synchronize the modulation of the optoelectronic detection and the synchronous detection and in which the reading circuits, synchronous detection means, connection means, addressing means and synchronization means are integrated onto the same substrate.

Thus, the manufacture of such an apparatus makes use of well-known microelectronics technologies. The connections by wire or the like with the exterior are reduced, facilitating the installation of the apparatus in a camera.

In a matrix of detecting elements produced by hybridization technology, each reading circuit is positioned beneath a detecting element. If permitted by the overall dimensions of a detecting element, the corresponding synchronous detection means is positioned in the vicinity of the reading circuit beneath the detecting element. In the opposite case, the synchronous detection means is placed outside the area of the substrate occupied by the reading circuits.

According to an advantageous embodiment making it possible to reduce the number of synchronous detection means used, the detection means of a column of the matrix are connected to the same synchronous detection means. This arrangement also makes it possible to reduce the number of connection means necessary and thereby simplify the manufacture of the apparatus. It is a question here of connections integrated into the substrate and the reduction of their number solves problems of intersection between several connections.

Each synchronous detection means comprises an amplifier producing an alternative connection, a selective filter connected by an input to an output of the amplifier, the selective filter having a centre frequency tuned on the modulation frequency, a peak-to-peak detection circuit connected by an input to an output of the selective filter and an integrator connected by an input to an output of the peak-to-peak detection circuit.

Advantageously, the selective filter is of the "N path filter type". This type of filter can be produced with the aid of MOS comonents (semiconductor with a gate isolated by silicon dioxide —$SiO_2$), which permit its integration on the substrate by conventional microelectronics technology. Advantageously, the peak-to-peak detection circuit is a double correlated sampler.

According to a variant of the apparatus, the latter also comprises a multiplexer connected to outputs of the synchronous detection means. The multiplexer makes it possible to supply signals coming from synchronous detection means to the conventional processing circuits of a shooting camera. Advantageously, the multiplexer is integrated onto the said substrate.

According to a variant of the apparatus, the modulation means incorporate a liquid crystal screen connected to the synchronization means. The liquid crystal screen placed in front of the matrix of detecting elements passes from an opaque to a transparent state, which leads to a modulation of the detected photon flux. Such a screen can be effectively switched to a high frequency of approximately 100 k Hz.

According to another variant of the apparatus, the modulation means are in the form of synchronization means. Direct modulation then takes place of the polarization voltage of the detecting element.

The invention is applicable to all types of detecting elements operating throughout the wavelength ranges.

The detecting elements can be photodiodes. For detection in the infrared, the improvement of the S/N ratio makes it possible to use HgCdTe photodiodes at a temperature close to 200 K. obtained by Peltier effect coolers, whereas conventionally these diodes operate at the temperature of liquid nitrogen (77 K.). Thus, as a result of the invention, it is much easier to produce HgCdTe photodiodes.

It only requires little maintenance and the continuous liquid nitrogen supply is eliminated.

The detecting elements can also be photodetector elements. Here again, low temperature operation is no longer necessary.

The detecting elements can also be capacitors having a capacitance varying as a function of the temperature. A matrix of capacitance meters is then produced, which permits shooting at ambient temperature.

Advantageously, each detecting element is connected to a reading circuit by an indium weld.

This so-called "hybridization" method makes it possible to connect elements produced in very different technologies, i.e. circuits integrated in the substrate to the detecting elements.

The invention is described in greater detail hereinafter relative to non-limitative embodiments and the attached drawings, wherein show:

FIG. 1 already described, diagrammatically the noise spectra in the case of imaging or shooting according to the prior art.

Figure 2:
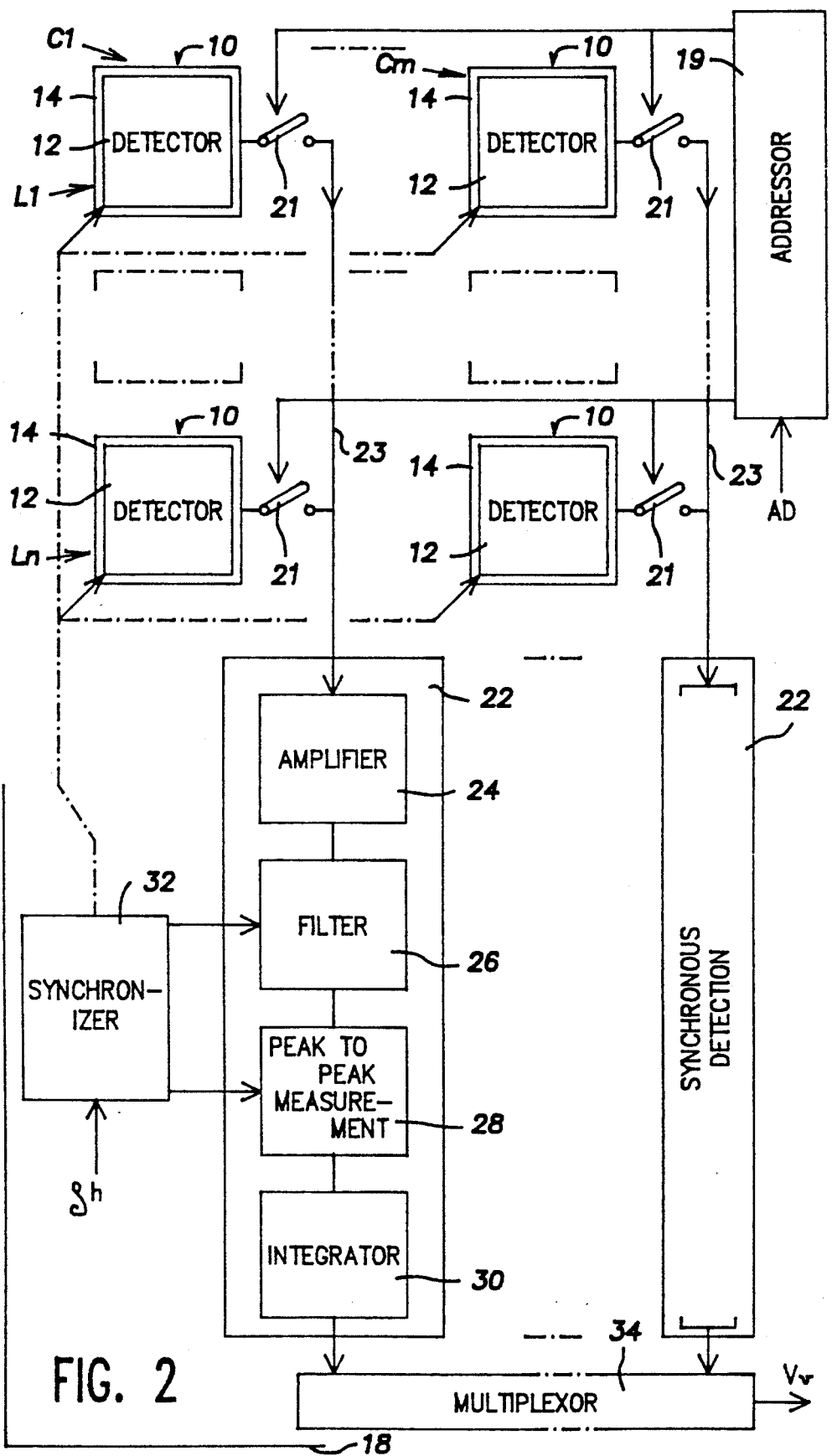

FIG. 2 diagrammatically an apparatus according to the invention.

Figure 3:
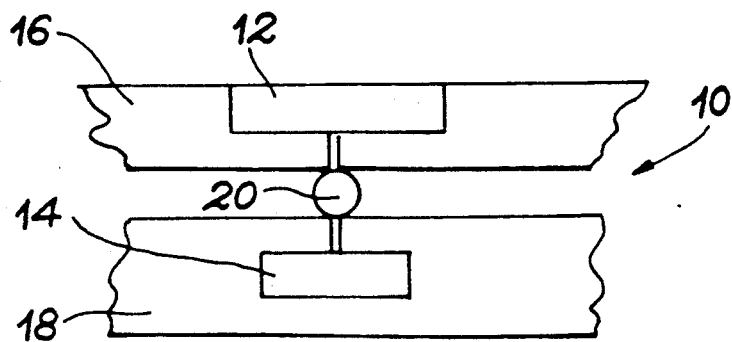

FIG. 3 diagrammatically a sectional view of a detection means used in an apparatus according to the invention.

Figure 4:
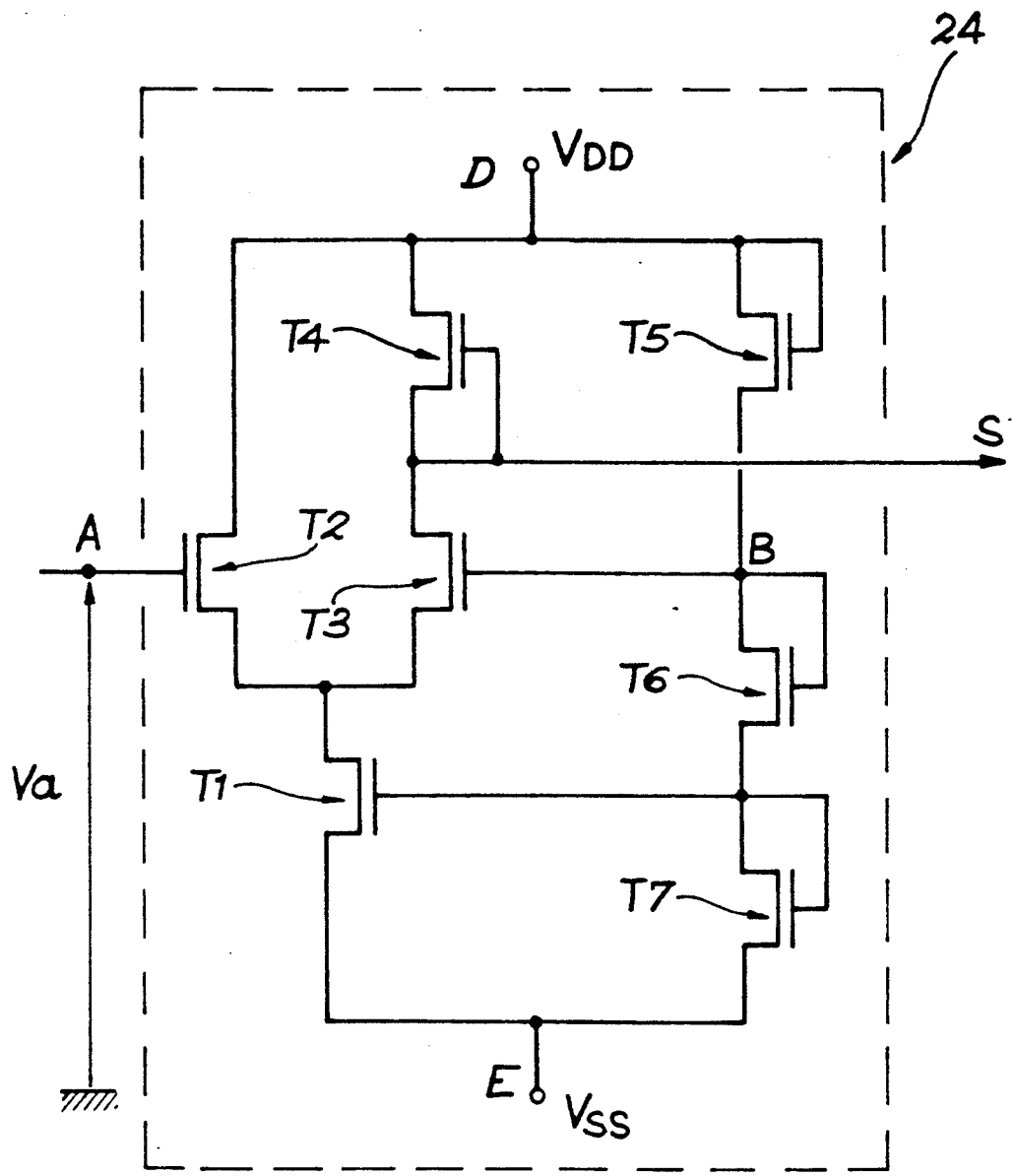

FIG. 4 diagrammatically an amplifier used in an apparatus according to the invention.

Figure 5:
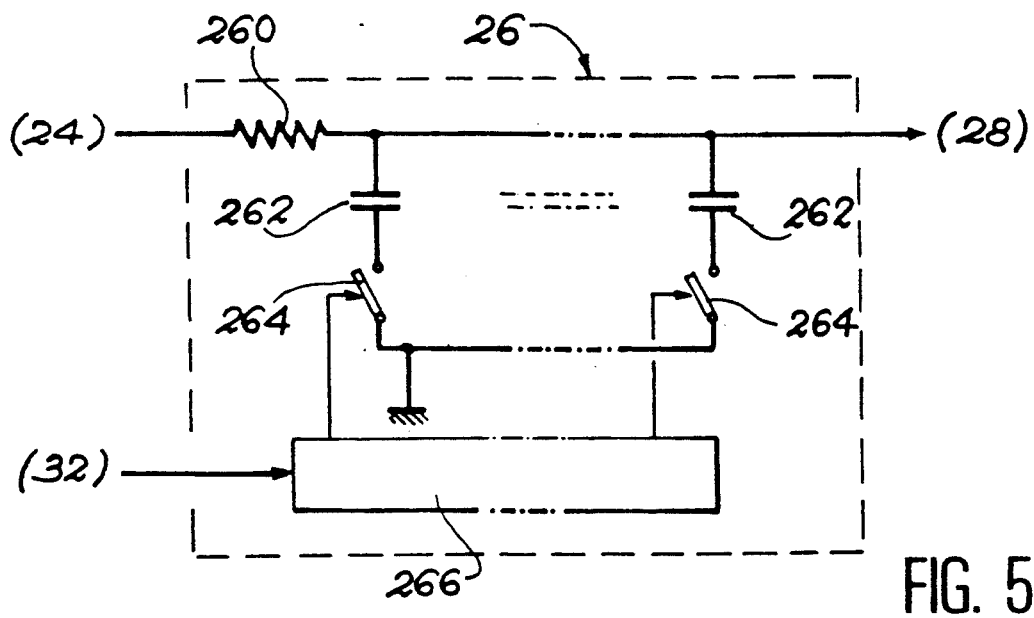

FIG. 5 diagrammatically a N path filter.

Figure 6:
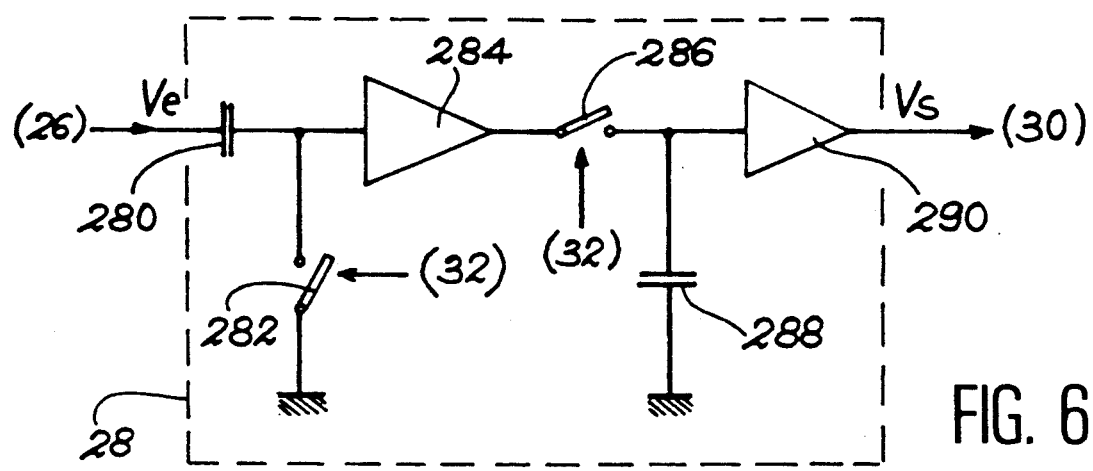

FIG. 6 diagrammatically a double correlated sampler.

FIGS. 7A, 7B, 7C, 7D diagrammatically and respectively a modulated signal applied to the input of the correlated double sampler, two chronograms of the control pulses applied to the correlated double sampler and the signal supplied at the output of the correlated double sampler.

Figure 8:
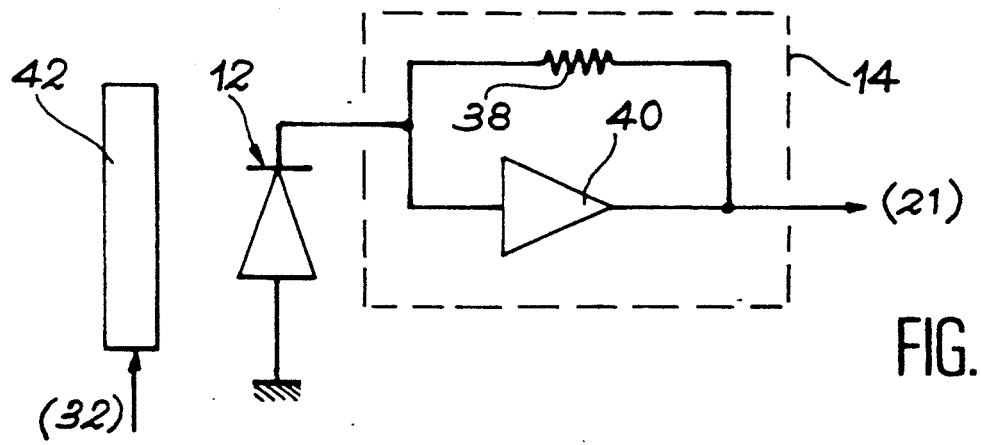

FIG. 8 diagrammatically a first photodiode detection means.

Figure 9:
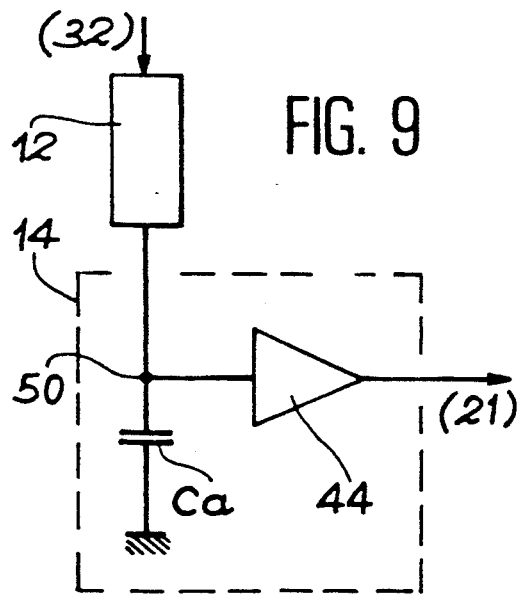

FIG. 9 diagrammatically a second photoconductor element detection means.

Figure 10:
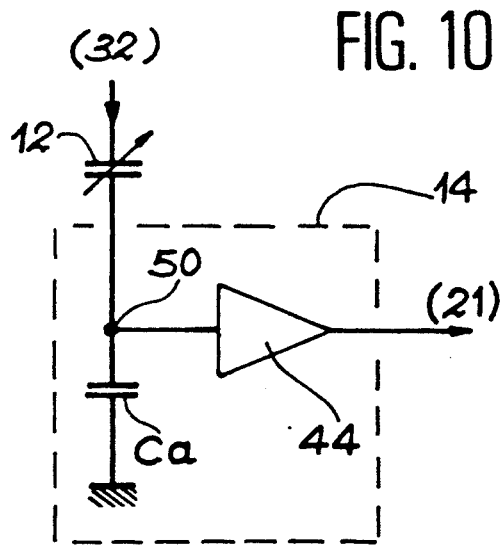

FIG. 10 diagrammatically a third variable capacitance capacitor detection means.

FIG. 2 diagrammatically shows an apparatus according to the invention. Optoelectronic detection means 10 are arranged in matrix form and the rows are designated Ll to Ln, in which n is e.g. 256 and the columns are designated Cl to Cm, in which m is e.g. equal to 256.

Each optoelectronic detection means 10 comprises a detecting element 12 connected to a reading circuit 14. During the imaging or shooting time, the reading circuit 14 integrates the current supplied by the detecting element 12. It also carries out an impedance matching for authorizing the reading of the integrated signal without deterioration.

It is possible to see in FIG. 3 an advantageous embodiment of the connection between the detecting element 12 and the reading circuit 14. The detecting elements 12 are arranged in matrix form and produced on a first substrate 16. The associated reading circuits 14 are arranged in a corresponding matrix and are produced on a second substrate 18. The connection between a detecting element 12 and a reading circuit 14 is obtained by crushing an indium ball 20 between the two substrates 16 and 18. This procedure for producing a matrix of detection means 10 is described in detail in the document Status of Sofradir IR-CCD Detectors—S-PIE, vol. 865, 1987, pp. 65-70. In this said arrangement, the reading circuit 14 is positioned beneath the detecting element 12, i.e. its surface does not exceed approximately 30×30 microns.

The detection of the incident photon flux by the detection means 10 is modulated to a modulation frequency fm of e.g. 100 KHz. This modulation can be obtained by different means, which will be described hereinafter. FIG. 2 shows that the synchronization means 32 are supplied by a clock signal of clock frequency fh supplied by a not shown clock and in which fh can be 1 MHz.

In the embodiment shown in FIG. 2, the synchronization means 32 supply modulation signals applied to inputs of detecting elements 12. As will be shown hereinafter, the synchronization means 32 supply to the outputs control and clock signals making it possible to ensure the synchronism of the operation of the different components of the apparatus.

FIG. 2 also shows that the apparatus comprises addressing means 19 integrated into the same substrate 18 as the reading circuits. The detection means matrix is addressed row by row. The addressing means 19 are formed by a register for decoding an address signal AD applied to an input. The register has the same number of outputs as the matrix has rows. A control signal is supplied in turn and as a function of the address signal AD to each output.

Such addressing means are e.g. of the type used in random access memory circuits. A description thereof is provided in the document "The "Random access memory" concept applied to the infrared focal plane'-'—L. Audaire et al. SPIE vol. 865, 1987, pp. 47-51.

Each reading circuit 14 is connected at the output to a switch 21 integrated into the substrate 18. The switches 21 can e.g. be constituted by TMOS transistors. The closing of the switches 21 associated with row of reading circuits 14 is controlled by a control signal supplied on an output of addressing means 19. The closing of a switch 21 connects a reading circuit 14 to an internal bus 23 integrated into the substrate 18.

The switches 21 and the internal buses 23 form connection means which connect each column of reading circuits 14 to a synchronous detection means 22 integrated into the substrate 18. The synchronous detection means 22 are formed by MOS components, so as to be easily integratable into the substrate 18.

Each synchronous detection means 22 comprises an amplifier 24 producing an alternative connection. The amplifier filters the continuous components of the signal which it amplifies. An example of such an amplifier is diagrammatically shown in FIG. 4. The transistor T1 constitutes a current generator, which is divided by the action of the transistors T3 and T2 as a function of the difference between the input voltage Va applied at point A and the voltage applied at point B. T1 constitutes a resistor, which measures the current flowing in the transistor T5. T5,T6,T7 constitute a voltage dividing bridge between the voltages VDD applied to point D and VSS applied to point E. VDD and VSS are supplied by not shown supply means. Thus, the polarization of the gates of the transistors T3 and T1 is brought about.

The output voltage S is the image of the input voltage Va, less the reference voltage Vb applied at B and amplified by the transistors T3 and T4.

FIG. 2 shows that a selective filter 26 is connected to an output of the amplifier 24. The selective filter is centered on the detection modulation frequency fm.

FIG. 5 diagrammatically shows an advantageous embodiment of the selective filter. The filter shown is known as a N path filter. Such a filter is described in the document (in French): "Automatic capture, tracking and recognition of the shape of a very widely frequency variable periodic signal buried in noise"—M. Gignoux, seventh conference on the processing of the signal and applications, Nice, 1979. As has been shown, it only comprises components which can easily be produced in MOS technology. It is constituted by an input resistor 260 connected to N identical capacitors 262. Each capacitor 262 is connected by one of its terminals to a switch 264, e.g. formed by an MOS transistor. When a switch 264 is closed, the associated capacitor 262 is connected to ground or earth.

A shift register 266 controls the successive closing of the switches 264 at the clock frequency fh, which is equal to N times the detection modulation frequency fm. This clock frequency is supplied by synchronization means 32. The capacitors 262 serve as a memory sampling the signal supplied by the amplifier 24.

Under the action of the shift register 266, the switches 264 are cyclically closed at the modulation frequency fm (equal to fh/N). Thus, as the synchronization means 32 are such that the control of the switches 264 is synchronous with the modulation of the detection, the components of the input signal at a frequency different from fh×N (i.e. fm) are filtered.

Thus, it is known that the frequency response of such a filter is constituted by a spectrum of lines centered around harmonics of the modulation frequency fm. Each of the lines has a passband equal to ½ pi NRC (half-width at mid-height of the line), in which pi is the well known reference designating the constant ratio of a circumference of a circle to its diameter (3.14), N is the number of capacitors 262 of the filter, in which N can be equal to 10 (for fh=1 Mhz and fm=100 kHz), C is the capacitance of the capacitors 262 and R is the value of the input resistor 260. The establishment time constant of such a filter is approximately NRC.

FIG. 2 shows that the output of the selective filter 26 is connected to the input of a peak-to-peak detection circuit 28. An embodiment of such a circuit will now be described relative to FIGS. 6, 7A, 7B, 7C and 7D. The circuit shown in FIG. 6 is known as a correlated double sampler. It comprises an alternative connection formed by a first capacitor 280 connected to a switch 282, e.g. constituted by a MOS transistor. When the switch 282 is closed, a terminal of the capacitor 280 is earthed or grounded. The closing of the switch 282 is controlled by a control signal supplied by synchronization means 32. The alternative connection is connected to a high input impedance amplifier 284. The output of the latter is connected to a switch 286 e.g. constituted by a MOS transistor. The closing of said switch 286 is controlled by a control signal supplied by the synchronization means 32.

A terminal of a capacitor 288 is connected to the switch 286, whilst its other terminal is grounded. A high input impedance amplifier 290 is also connected to the switch 286 and at the output supplies the demodulated output signal Vs.

Figure 7:
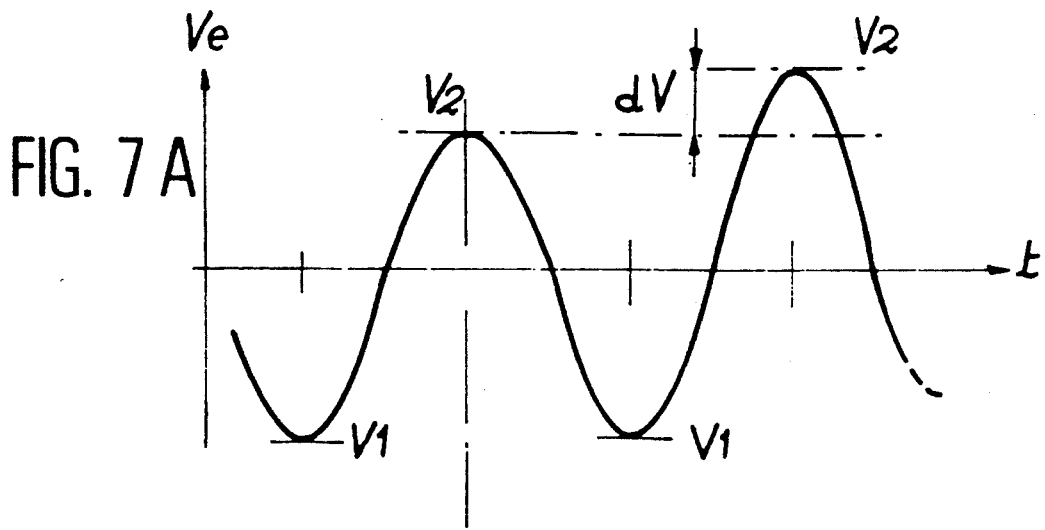
Figure 7:
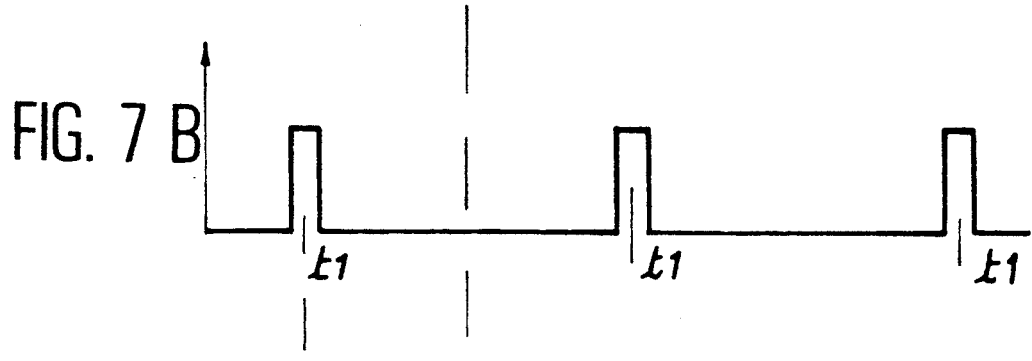
Figure 7:
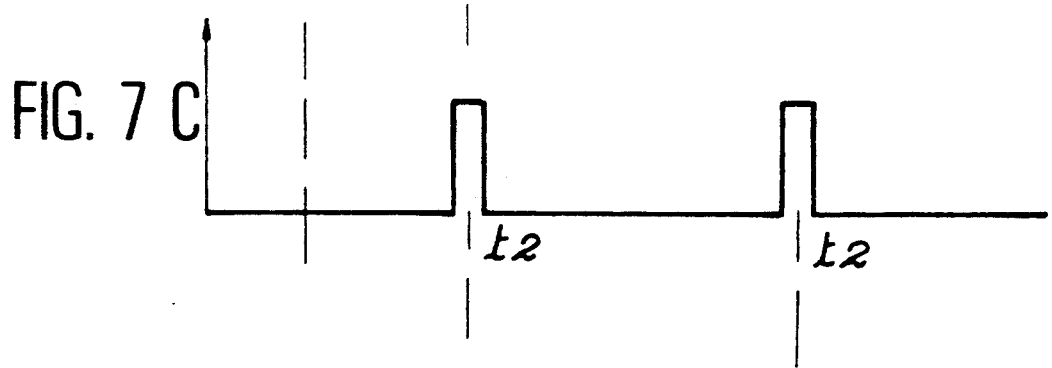
Figure 7:
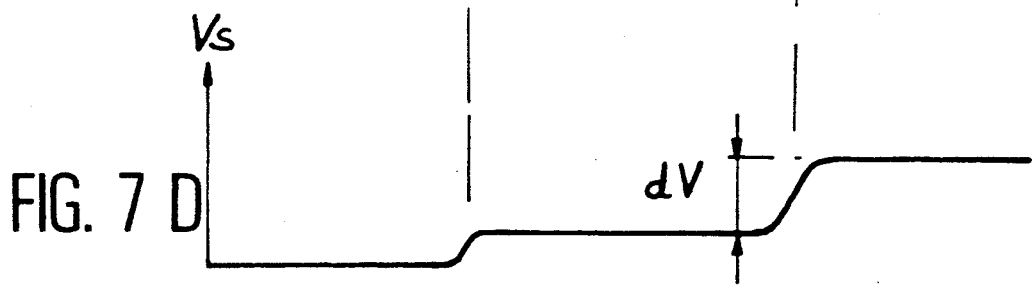

FIG. 7A shows a signal Ve applied to the input of the correlated double sampler. This signal Ve of frequency fm has amplitude variations dV representative of illumination or lighting variations detected by the detecting means connected to the synchronous detection means. Ve has minima V1 and maxima V2.

FIG. 7B diagrammatically shows the closing controls of the switch 282. Closures occur at times t1 in phase with the appearance of the minima V1. FIG. 7C diagrammatically shows the closing controls of the switch 286. Closures occur at times t2 in phase with the appearance of the maxima V2.

After a closing of the switch 282, the capacitor 280 is charged to the value V1. At time t2, when the switch 286 is closed, the capacitor 288 is charged to the value V2−V1. At each period, synchronized with the modulation frequency fm, the output of the amplifier 290 supplies an output signal Vs (FIG. 7D) proportional to the variations dV of the input signal Ve.

With reference to FIG. 2, it can be seen that the output of the correlated double sampler 28 is connected to an integrating circuit 30, which smooths the signal Vs.

For each addressing of a row of detection means 10, the synchronous detection means 22 supply a signal to the outputs connected to the inputs of a multiplexer 34 integrated into the substrate 18. The structure of this multiplexer is identical to the aforementioned row addressing multiplexer. It operates at the scanning frequency of the elementary points, whereas the row addressing operates at the scanning frequency of the rows.

The multiplexer supplies a video signal Vv on an output. This signal can be processed by the shooting camera (e.g. recording on a support, etc.).

As has been shown hereinbefore, it is as a result of the modulation of the detection and a filtering of the continuous frequencies during demodulation that the S/N ratio is improved.

The following description relates to three types of detection means usable in an apparatus according to the invention. The modulation means involved will also be described for each type.

With reference to FIG. 8, a description will be given of a first detection means comprising as the detecting element 12, an e.g. HgCdTe photodiode for a detection in the infrared and connected to a reading circuit 14. The latter has a resistor 38 negative feedback-connected to an amplifier 40.

The modulation means used in this case is a liquid crystal screen 42 controlled by a modulation signal at the frequency fm supplied by the synchronization means 32. At this frequency the screen becomes alternately transparent and opaque. In this way the incident photon flux on the photodiode is modulated to the frequency fm. A screen of this type can be modulated to a high frequency of approximately 100 kHz, thus improving the performance characteristics of the apparatus. Normally HgCdTe photodiodes operate at the temperature of liquid nitrogen (77 K.) in order to minimize heat-caused obscurity currents.

The use of the apparatus according to the invention makes it possible to use such photodiodes at a temperature close to 200 K. At this temperature, the heat-caused current is approximately 1 microampere (and doubles every 4 K.), whereas the current corresponding to the information-carrying photoflux is a few nanoamperes. However, this heat-caused current is not modulated and the corresponding parasitic signal is filtered by the synchronous detection. This makes it possible to use these photodiodes at high temperatures.

The following description relative to FIGS. 9 and 10 relates to an embodiment of the modulation-detection means having a particularly interesting characteristic.

Thus, according to this embodiment relative to two examples shown in FIGS. 9 and 10, use is made of the non-linear behaviour of the detectors for bringing about modulation. It is conventional practice to seek to correct the parasitic effects caused by the non-linear behaviour of detectors rather than make use of said characteristic. FIG. 9 shows a detection means conventionally used at low temperature and which is able to operate at temperatures close to 200 K. in an apparatus according to the invention. In this case, the detecting element 12 is a photoconductor element, whose electrical conductivity is modified by the incident photon flux.

For a given incident photon flux, it is known that the conductivity is dependent on the polarization of the photodetector. According to the invention, the modulation of the detection is obtained as a result of the modulation of the polarization. For this purpose, the photoconductor is directly connected to the synchronization means 32, which supply a polarization signal modulated to the frequency fm. The connection 50 is e.g. obtained by means of an indium ball weld.

As the conductance G of the detector 12 is proportional to the product of the input signal which is the number of photons -n(t)- detected as a function of time and of the polarization voltage -sin (2*pi*fm*t)- applied between the input 32 and the node 50 at the terminals of the detector, we obtain:

$$G = K^* n(t)^* \sin(2^* pi^* fm^* t)$$

so that the modulation means is the actual detector 12 with which is associated the capacitor Ca for forming an impedance dividing bridge. The modulation control is the electric signal applied to the detector input 32.

For the modulation control signal, the conductance and the capacitor Ca constitute an impedance dividing bridge. The amplitude and phase of the signal at the node 50 are modulated by the input signal n(t). These variations are measured by the synchronous demodulation with all the advantages associated with the invention.

The reading circuit 14 is formed by a capacitor Ca connected by one terminal to an amplifier 44 and by another terminal to ground.

FIG. 10 shows another type of detection means. The detecting element is constituted by a capacitor 12, whose capacitance is a function of the temperature and therefore the incident photon flux (the light energy being converted into heat energy).

One terminal of the variable capacitance capacitor is connected to the synchronization means 32, which supply a polarization signal of frequency fm. The connection 50 is e.g. produced by an indium ball. The other terminal of this capacitor is connected to the reading circuit 14, which measures the variable capacitance. It comprises a fixed capacitance capacitor Ca connected to an amplifier 44. The capacitors are connected to one another and the a.c. voltage at the connection point is a function of the capacitive ratio. This voltage is amplitude modulated by the temperature variations due to the photon flux.

It is known that ferroelectric dielectrics (e.g. polyvinyl difluoride) have a permittivity, which varies strongly around certain critical operating temperatures (in particular the Curie temperature). The capacitor 12 formed from one of these materials is maintained at an average temperature close to this critical temperature by a per se known, not shown means. The absorption of the energy of the photons leads to a variation of the said temperature around the mean temperature and consequently varies the capacitance around a mean capacitance.

The detector 12 and the capacitor Ca constitute an impedance dividing bridge for a signal 32 applied at 12. The signal at the node 50 will vary in amplitude as a function of the number of photons absorbed by the detector 12. These variations are measured by the synchronous demodulation with all the advantages associated with the invention.

Therefore the modulation means is the actual detector 12 with the capacitor Ca. The modulation control is the electric signal applied to the detector input 32.

An imaging device according to the invention can be produced by all integration methods. The integration makes it possible to place in the focal plane of a camera a system which is only sensitive to the modulated signal, thus eliminating all the parasitic signals due to continuous or d.c. components. Moreover, by choosing a sufficiently high modulation frequency, account is no longer taken of the parasitic component in 1/f.

Another advantage of the apparatus according to the invention results from the lack of sensitivity of the apparatus to dispersions of the operating points of the detecting elements, as well as variations due to factors other than the incident photon flux.

The invention is not limited to the embodiments specifically described and shown and covers all variants thereof. In particular, although there is nothing to restrict the number of columns, the number of rows is limited by the establishment time of the selective filter. In order to increase the number of rows, it is possible to place side by side or head to tail two identical apparatuses integrated into the same substrate (apart from the detecting elements which are produced on a separate substrate).

We claim:

1. Imaging device comprising: several optoelectronic detection means (10) for converting a photon flux into an electrical signal, these optoelectronic detection means (10) being arranged in matrix form with at least one row and several columns, each optoelectronic detection means (10) incorporating a detecting element (12) connected to a reading circuit (14) located in a substrate; modulating means for modulating the optoelectronic detection (10) at a modulation frequency (fm); several synchronous detection means (22) at the modulation frequency (fm), each synchronous detection means including a filtering means (26) for filtering continuous frequencies during demodulation; connection means (21, 23) for connecting each optoelectronic detection means to a synchronous detection means (22); addressing means (19) for addressing the optoelectronic detection means (10); and synchronization means (32) able to synchronize the modulation of the optoelectronic detection and the synchronous detection, wherein each of the synchronous detection means is integrated into the substrate and comprises an amplifier (24) forming an alternative connection, a selective filter (26) connected by an input to an output of the amplifier (24), the selective filter (26) having a center frequency tuned on the modulation frequency (fm), a peak-to-peak detection circuit (28) connected by an input to an output of the selective filter (26) and an integrator (30) connected by an input to an output of the peak-to-peak detection circuit (28).

2. Device according to claim 1, characterized in that the detection means (10) of a column of the matrix are connected to the same synchronous detection means (22).

3. Device according to claim 1, characterized in that the selective filter (26) is of the N path filter type.

4. Device according to claim 1, characterized in that the peak-to-peak detection circuit (28) is a correlated double sampler.

5. Device according to claim 1, characterized in that it also comprises a multiplexer (34) connected to outputs of synchronous detection means (22).

6. Device according to claim 5, characterized in that the multiplexer (34) is integrated onto the substrate (18).

7. Device according to claim 1, characterized in that the modulation means incorporated a liquid crystal screen (42) connected to the synchronization means (32).

8. Device according to claim 1, characterized in that the detecting means (12) are photodiodes.

9. Device according to claim 1, characterized in that the modulation means are formed by a divider bridge formed by detection means (12) and an impedance element (Z).

10. Device according to claim 9, characterized in that the detection means (12) are constituted by a photodetector element and the impedance element (Z) by a capacitor (Ca).

11. Device according to claim 9, characterized in that the detection means (12) are constituted by a capacitor, whose capacitance varies as a function of the temperature and the impedance element (2) by a capacitor (Ca).

12. Device according to claim 1, characterized in that each detecting element (12) is connected to an associated reading circuit by an indium weld (20).

13. Device according to any one of the preceding claims, characterized in that at least the reading circuits (14), the synchronous detection means (22), the connection means (21,23), the addressing means (19) and the synchronization means (32) are integrated onto the same substrate.

* * * * *

UNITED STATES PATENT AND TRADEMARK OFFICE
CERTIFICATE OF CORRECTION

PATENT NO. : 5,216,510

DATED : June 1, 1993

INVENTOR(S) : Daniel Amingual, et al.

It is certified that error appears in the above-identified patent and that said Letters Patent is hereby corrected as shown below:

On title page, item [56] "OTHER PUBLICATIONS" line 2, "filters" should be --filtres--.

Column 4, line 19, "photconductor" should be --photoconductor--.

Column 5, lines 10-11, move "plane'" to the beginning of line 11.

Column 5, line 15, after "with" insert --a --.

Signed and Sealed this

Twelfth Day of April, 1994

Attest:

BRUCE LEHMAN

*Commissioner of Patents and Trademarks*

*Attesting Officer*